July 12, 1966 N. PAXSON 3,260,417
MATERIAL DISPENSER
Filed Jan. 7, 1965 2 Sheets-Sheet 1
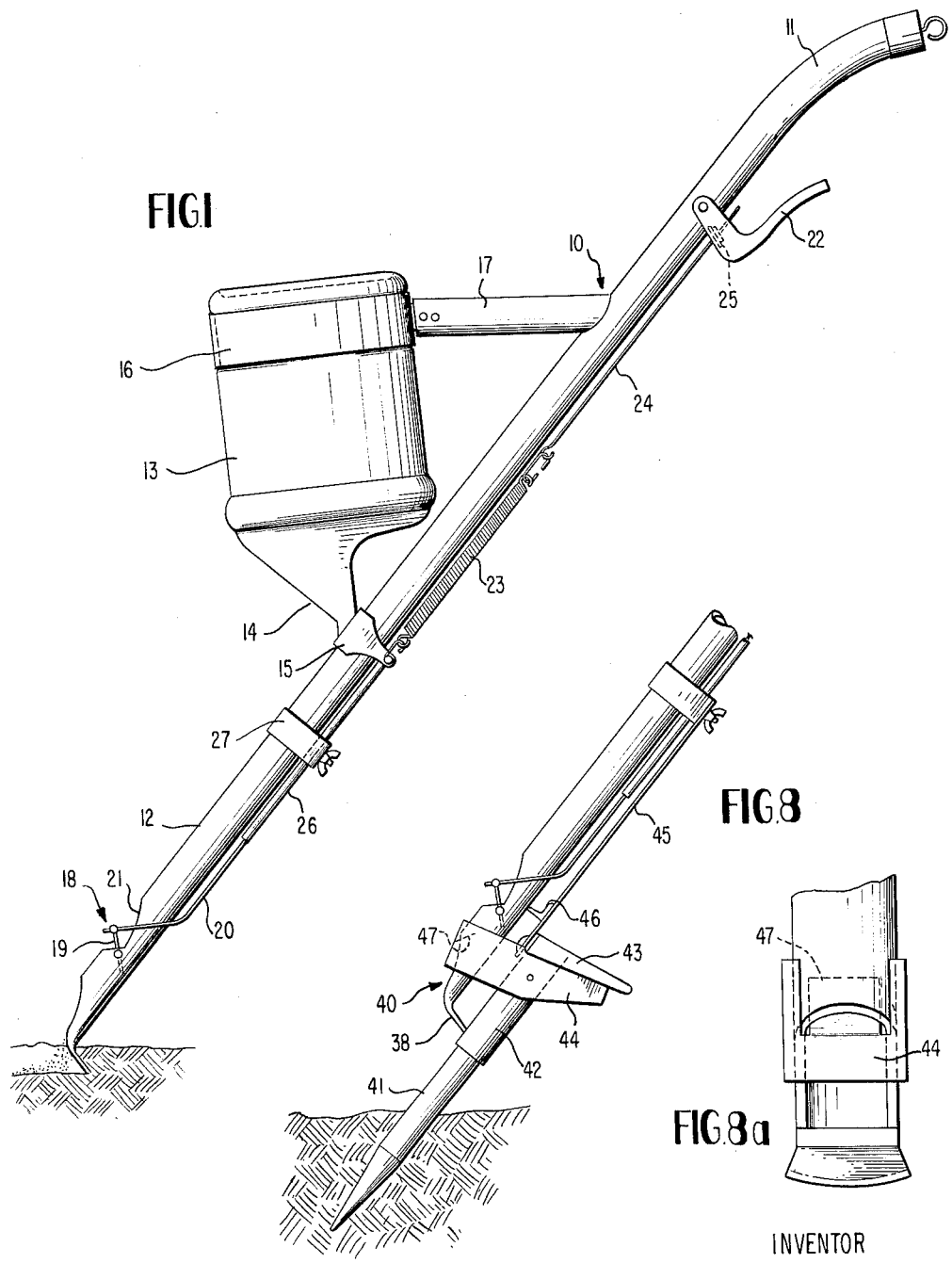
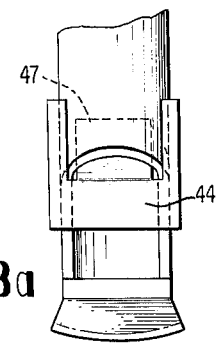
INVENTOR
NORMAN PAXSON
BY *Dicke + Craig*
ATTORNEYS July 12, 1966  N. PAXSON  3,260,417
MATERIAL DISPENSER
Filed Jan. 7, 1965  2 Sheets-Sheet 2
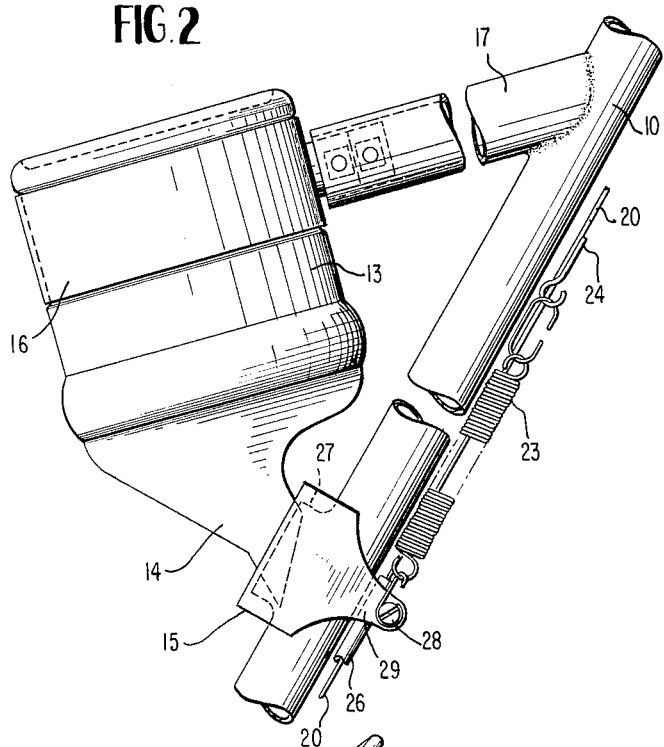
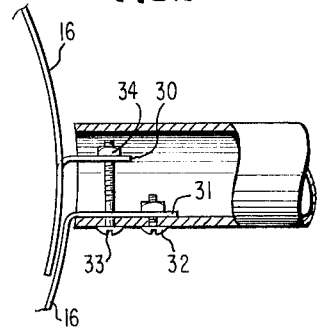
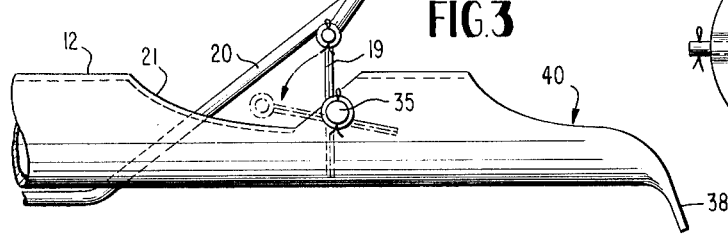
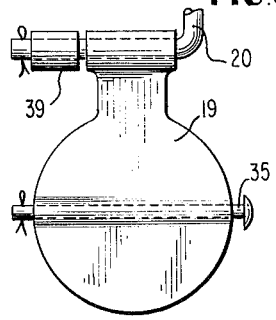
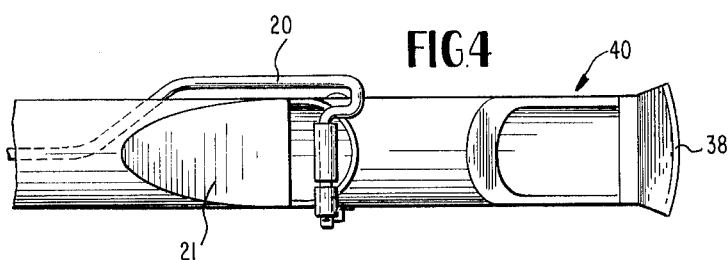
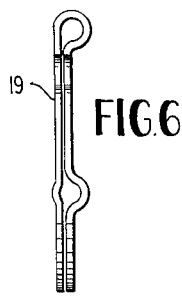
INVENTOR
NORMAN PAXSON
BY *Dicke & Craig*
ATTORNEYS 3,260,417
MATERIAL DISPENSER
Norman Paxson, 218 S. Lakeside Drive,
Lake Worth, Fla. 33460
Filed Jan. 7, 1965, Ser. No. 424,104
16 Claims. (Cl. 222—191)

The present invention relates in general to plant irrigators and fertilizer mechanisms, and more particularly relates to a portable hand-manipulated device for spreading dry fertilizers in and around growing plants.

The use of organic and synthetic fertilizers to nourish growing plants has been widely accepted, and the need to provide frequent supplemental nourishment for trees, shubs and other common plants is generally recognized. In view of this wide acceptance of modern day techniques for caring for growing plants, the need for a simple, portable fertilizer dispenser which can be easily carried to individual trees and shrubs, and which can dispense an accurate amount of fertilizer material in such a way that the plant will receive the most benefit therefrom, has already evidenced itself.

In meeting this need for a portable fertilizer dispenser, the prior art has provided several constructions for injecting a liquid or a dry fertilizer directly into the soil adjacent to the trees or shrubs. In the type of dispenser which injects a liquid fertilizer into the soil, a tubular member, usually having a pointed end for insertion into the soil is connected to a water supply, and a reservoir or other container housing the liquid fertilizer communicates with the tubular member in such a way that metered amounts of the liquid fertilizer are combined with the water passing through the tubular member and into the soil. The primary disadvantage of this construction is the need for a water supply in combination with the dispenser, which water supply is usually provided by a hose or other water conduit connected to a primary supply. The device is therefore limited in use to an area within range of the hose, and use of the device is materially hindered due to the necessity of having to drag a bulky hose or other water conduit along with the device. As is also generally known, the application of liquid fertilizer to the soil does not provide the continuing nourishment that can be provided by dry fertilizers, and so, much more frequent application of a fertilizer is necessary when the liquid dispensing devices are used.

Other devices provided in the prior art, which are designed to dispense dry fertilizer thereby eliminating the need for a water supply, also have proven to be unsatisfactory in use. In one type of such device a tubular member having a pointed end is adapted to be forced into the soil adjacent the plant to be fertilized, and the tubular member is provided with a reservoir at one end thereof which supplies the dry fertilizer to the tube for dispensing deep into the soil. However, in devices of this type, great difficulty is encountered in accurately metering the supply of fertilizer dispensed so that not only is fertilizer wasted to a great degree, but the danger of providing an excessive amount of fertilizer thereby endangering the plant is possible.

The control valves provided on these devices are very often placed at the pointed end of the device so that due to the restricted nature of the hole into which the device is inserted, the control valve is difficult to operate. In addition, many of the prior art devices provide for the control linkage passing through the tubular member through which the fertilizer is dispensed thereby additionally complicating control of the regulating valve since the slightest amount of settling of the fertilizer in material tends to compact the material sufficiently to lock the control rod and valve mechanism, rendering the device inoperative. As a further consideration, the placement of these control parts within the tubular member containing the fertilizer leads to a clogging of the parts over a period of time, and a general reduction in the efficiency of operation of the apparatus results.

In other devices of the prior art for dispensing dry fertilizer, where the control valve arrangement is placed at the end of the dispensing tube opposite from that end which is inserted in or placed adjacent to the soil, complicated valve mechanisms have been provided for controlling the amount of fertilizer dispensed so that the cost of these mechanisms has been increased to a considerable extent and the chance for failure or a breakdown of the device is also materially increased as compared to devices of more simple construction. In certain of the devices of the prior art, a control valve is provided which restricts the amount of fertilizer applied or dispensed to a measured quantity so that a repeated triggering is necessary to dispense more than this metered amount. While the provision of a control valve for restricting the amount of material dispensed to a metered amount is beneficial under many circumstances, it is very often desirable to dispense fertilizer into a trench or rut over an extensive area, and this will require much more fertilizer than provided by the single metered amount of the prior art devices. As a result repeated triggering is necessary for widespread application necessitating the expenditure of considerable time.

The devices of the prior art have also been unsatisfactory from the standpoint that the constructions provided do not lend themselves readily to disassembly and cleaning which is absolutely necessary to proper continuous trouble-free operation of the device. In addition the use of closed reservoirs requires removal of the reservoir for refilling. The manner in which the reservoirs are secured to the dispensing tubes, while permitting removal for refilling, often necessitates the inversion of the container prior to securing it to the dispensing tube so that fertilizer is lost. Difficulty is additionally encountered in these devices in securing the reservoir to the dispensing tube due to the fertilizer filling up the connecting means prior to insertion of the reservoir therein.

The instant invention therefore provides a portable fertilizer dispenser comprising a tubular member having a handle portion and a dispensing portion with an open top reservoir mounted thereon in communication with the dispensing portion of the tubular member. The free end of the dispensing portion of the tubular member is provided with a scraper or hoe-like plate, which is used to dig a groove or trench in the soil while simultaneously dispensing the fertilizer into the trench with one simple operation. In this way, fertilizer is injected into the soil under the surface thereof where it can do the most good and this can be accomplished over a wide area, such as in a garden or along a hedge row.

The invention also provides a unique connection between the reservoir for the fertilizer and the dispensing portion of the tubular member in the form of a saddle connection which accommodates a spout portion on the reservoir and maintains it by wedge fit in communication with an opening in the tubular member communicating with the dispensing portion of the member. In this way no screw-type connection is necessary with the dispensing portion of the tubular member and the reservoir can be mounted into position should it become changed or need replacing for any reason, by merely placing the dispensing end thereof in contact with the saddle connection and tipping the reservoir up until the dispensing end of the reservoir is inserted and wedged within the saddle connection. The upper end of the reservoir is then retained in position by a brace or other securing member. Thereafter, the reservoir need not be removed since the open top permits refilling without removal. The open top of the reservoir is provided with a rolled rim which further strengthens the top edge thereof.

Of primary importance with regard to the instant invention is the manner of control over the fertilizer in the dispensing portion of the tubular member so that accurate amounts of fertilizer can be dispensed in accordance with the wishes of the operator. This control valve is in the form of a pivotal baffle located adjacent to the dispensing end of the tubular member, which tubular member is provided with a cut-out portion to insure free actuation of the valve and to make possible a wide range of control thereby. In addition, the control lever which actuates the baffle is provided with a spring arrangement effecting return of the valve to the closed position, and the control lever passes through the spring arrangement and through a tubular guide member so that transverse forces on the control lever are eliminated, effecting accurate response to the actuation by the operator.

The instant invention provides in addition to the scraper plate at the end of the dispensing tube for making grooves or trenches in the soil, a detachable sod piercer which is connectable to the lower portion of the dispensing tube in such a manner that the piercer can be forced into the soil making a hole adjacent to the plant or tree to be fertilized, which hole is then filled with fertilizer in the normal manner from the dispensing end of the tube.

Accordingly, it is an object of the instant invention to provide a garden tool or implement for dispensing dry fertilizer, which avoids all of the disadvantages inherent in prior art devices in a simple and economical manner.

It is still another object of the instant invention to provide a portable dispenser for dry fertilizer which is capable of dispensing dry fertilizer having an open top reservoir for the fertilizer which is associated with the normal dispensing portion of the apparatus in an extremely simple and secure manner, making possible the easy removal and replacement of the reservoir when replacement is necessary.

It is still a further object of the instant invention to provide a garden tool or implement for dispensing dry fertilizer wherein all parts of the apparatus are easily disassembled and all parts directly in contact with the fertilizer are provided of a material which prevents corrosion or pitting insuring free operation over extensive periods of time.

These and other objects, features and advantages of the present invention will become more apparent from the following description when taken in connection with the accompanying drawings in which:

FIGURE 1 is a side elevational view of one exemplary embodiment of the instant invention;

FIGURE 2 is a detailed view of the reservoir and its connection to the main body of the tubular dispensing member as illustrated in FIGURE 1;

FIGURE 3 is a side detail view of the control valve illustrated in FIGURE 1;

FIGURE 4 is a top plan view of the control valve and scraper plate construction illustrated in FIGURE 1;

FIGURE 5 is a detail view of the baffle plate construction of the control valve;

FIGURE 6 is a side view illustrating the particular construction of the baffle plate shown in FIGURE 5;

FIGURE 7 is a detail sectional view of the clamp connection for the reservoir illustrated in FIGURE 2;

FIGURE 8 is a side elevational view of a sod piercer attachment for the dispensing apparatus of FIGURE 1; and FIGURE 8a shows a detail of a means for fastening the sod piercer attachment of FIGURE 8 to the material dispenser illustrated in FIGURE 1.

Turning to a more specific description of the invention, as shown in the accompanying drawings wherein like reference numerals are used to designate like parts wherever possible throughout the various views, FIGURE 1 illustrates the overall combination of one exemplary embodiment of the invention as consisting of a tubular member 10 having a handle portion 11 and a dispensing portion 12. The entire member 10 is preferably of tubular construction in spite of the fact that only the dispensing portion 12 need be hollow to accommodate the fertilizer; however, in providing the entire member 10 of tubular construction, the overall weight of the device is materially reduced providing for ease of handling and use over an extended period of time without fatigue. It may also be preferable in accordance with the instant invention to provide the tubular member of stainless steel or other non-corrosive material to positively prevent corroding or pitting, which could hinder operation of the device. The length of the member is chosen so that a person of ordinary height may use the device while in a normal upright position.

In combination with the tubular member 10, there is provided an open top reservoir 13 having a dispensing spout 14 accommodated within a saddle type connection 15. The upper end of the reservoir 13 is secured in position by a clamping band 16 adjustably secured to an extension projecting from the tubular member 10. The extension 17 is preferably of tubular construction similar to tubular member 10 and is welded or otherwise rigidly secured to the member with an annular orientation sufficient to insure proper disposition and rigidity of the reservoir 13 during operation of the device.

The dispensing portion 12 of tubular member 10 is provided near the extreme end thereof with a control valve arrangement 18 consisting of a rotating baffle plate 19 and a control lever 20. The tubular member is provided in the vicinity of the control valve 18 with a cut out portion 21 which diverts pressure from the top of the valve and prevents clogging thereof. In addition, this notch or cut out portion 21 materially increases the degree of control which can be effected by the control valve so that a wide range of metered quantities of fertilizer can be dispensed.

The control rod 20 passes from the baffle plate 19 along the length of the tubular member 10 to a control handle 22 adjacent the handle portion 11 of the tubular member. The handle 22 is pivotally secured to the tubular member 10 and is biased in the open or clockwise direction of rotation by a spring member 23, secured at one end thereof to the saddle connection 15 and the other end thereof to a linkage rod 24 connected to the handle 22. The connection between the linkage rod 24 and the handle 22 includes the interposition of a plurality of split filler washers 25 which serve to take up the lost motion of the control linkage. The control rod 20 passes through a tubular housing 26 clamped to the tubular member 10 by means of a collar 27 and is also secured at one extreme end by the saddle connection 15, as seen in FIGURE 2. The control rod 20 passes through the tubular housing 26 and through the center of return spring 23 to the control handle 22. By providing the housing 26 and passing the control rod 20 through the center of return spring 23, the control rod is positively guided parallel to the axis of tubular member 10 and all transverse forces on the control rod are avoided, resulting in a positive simplified operation of the control valve 18.

Turning now to FIGURE 2 which provides a detailed illustration of the reservoir 13 and its association with the tubular member 10, the dispensing spout 14 of the reservoir 13 is inserted into an elliptical aperture in the saddle connection 15, and due to the size and shape of the aperture and the tapered design of the dispensing spout 14, the spout will wedge itself within the saddle connection 15, and will also lodge itself within an integral apertured projection 27 of the tubular member 10 so that the interior of the reservoir 13 will be in communication with the hollow interior of the member 10.

Because of the wedge-type fit provided by the saddle connection 15 in combination with the dispensing spout 14, removal and reinsertion of the reservoir can be accomplished with ease. The saddle connection 15 is clamped about the tubular member 10 and secured in position by a clamping screw 28 connecting a pair of integral clamping projections 29 (only one of which is shown in FIG. 2). The integral clamping projection 29 can also serve to retain the end of tubular housing 26 in position adjacent the member 10 so as to ensure proper disposition of the control rod 20.

The upper open end of the reservoir 13 is provided with a rolled rim for strengthening the edge of the opening in the top thereof. The reservoir is maintained in position by the tubular extension 17 and the clamping band 16 which is adjustable with regard to the tubular member so that the reservoir 13 may be easily removed from the dispensing device whenever desired. As seen in FIGURE 7, the clamping band 16 is provided at one end thereof with a clamping projection 30 and at the other end thereof with a clamping projection 31. Both projections are inserted into the hollow interior of the extension 17 with the clamping projection 31 secured to the inner wall of the extension 17 by way of a screw or other fastening member 32. A second screw or fastening member 33 positioned adjacent to the screw 32 passes through one end of the clamping member 30 which is maintained against the fastening nut 34 by the spring tension in the clamping band 16. Tightening of the clamping band is easily effected by adjusting the screw 33 to tighten or release the band.

Looking to FIGURES 3 and 4, it is seen that the baffle plate 19 is pivotally mounted upon the dispensing end 12 of the tubular member by means of a pivot shaft 35 passing through the body of the tubular member and maintained in position by a cotter pin or other conventional fastening means. The pin 35 is preferably mounted loosely within the tubular member so as to facilitate rotation of the baffle 19. The notch 21 provided in the tubular member to facilitate actuation of the control valve is seen in FIGURE 4 as sloping toward the dispensing end 40 of the device and communicates adjacent to the control valve with a transverse groove aperture extending through to the center of the hollow shaft within which the control valve is accommodated. The dispensing end 40 of the device is also provided with a notched configuration so that the aperture from which the fertilizer flows is in the form of a scoop thereby facilitating the dispensing of the fertilizer material in a desired direction as provided by the operator. The dispensing end 40 also includes the scraper plate or hoe-like portion which is used to groove or trench the ground so as to deposit the fertilizer material under the surface of the soil where it will communicate more quickly with the roots of the plants or trees to be nourished.

As seen in FIGS. 5 and 6, the baffle plate 19 is substantially circular and is formed by doubling over a symmetrically shaped metal member so that the bearing portions for the control rod 20 and the pivot shaft 35 are produced in a relatively simple manner. A spacer 39 is provided between the baffle plate 19 and the end of the control rod 20 to insure that the cotter pin or other fastening means used to maintain the baffle plate 19 on the control rod 20 does not interfere with the body of the tubular member during operation of the apparatus.

When working with hard soil or with plants which require a deep penetration of fertilizer, it is often desirable to provide a hole or aperture in the ground into which the fertilizer is dispensed. In order to provide for such a hole in conjunction with the apparatus, the instant invention provides for a sod piercer attachment, illustrated in FIG. 8. The piercer itself consists of a tapered wooden rod or shaft 41 which is fixed to a tubular member 42 having a step plate 43 fastened at one end thereof. A box shaped member 44 is fastened to the tubular member 42 beneath the step 43 and passes over the dispensing end 40 of the device to positively clamp the scraper plate 38 against the body of the tubular member 42. As seen in FIGURE 8a a tongue or lip 47 formed on the box shaped member 44 slides into the opening at the dispensing end 40 and wedges therein to prevent swing motion of the step 43 during use. A support arm 45 for the upper end of the sod piercer is fastened by any conventional means to the portion of the tubular member adjacent to step 43 and the support arm 45 is secured at its other end to the clamp 27, which serves additionally to secure the tubular housing 26. A step member 46 secured to the support arm 45 contacts the surface of the tubular member 10 to insure proper spacing of the support arm from the tubular member and to stiffen and hold the lip in place during operation of the sod piercing device.

The parts of the dispensing device disclosed which communicate with the fertilizer material should be provided as a stainless steel or other non-corrosive metal so that pitting and corrosion will not affect the operation of the device. In addition, it is generally proposed that the reservoir be made of a polyethylene or other synthetic material which is clearly inert to the effect of the fertilizer so that damage to the reservoir will not result due to prolonged contact wtih the fertilizer material.

While I have shown and described one embodiment in accordance with the present invention, it is understood that the same is not limited thereto, but is susceptible of numerous changes and modifications within the spirit and scope thereof as known to a person skilled in the art, and I therefore do not wish to be limited to the details shown and described herein, but intend to cover all such changes and modifications as are encompassed by the scope of the appended claims.

I claim:

1. A portable hand manipulated device for spreading dry fertilizers comprising:
   an elongate tubular member having an upper handle portion and a lower dispensing portion,
   reservoir means capable of storing a quantity of fertilizer material having a body portion and a dispensing spout integral with said body portion,
   aperture means in said tubular member between said handle portion and said dispensing portion providing access to the inside of said tubular member.
   saddle connecting means surrounding said aperture means and providing support for said reservoir means, said dispensing spout being supported in said saddle connecting means and said aperture means by wedge fit,
   bracket means for supporting the body portion of said reservoir means including an adjustable compression band surrounding said body portion and a support member rigidly secured to said handle portion and connected to said compression band, and
   control valve means within said dispensing portion adjacent a free end thereof for selectively restricting the hollow interior of said tubular member so as to control the quantity of fertilizer dispensed.

2. A portable hand manipulated device for spreading dry fertilizers comprising:
   an elongate tubular member having an upper handle portion and a lower dispensing portion,
   reservoir means capable of storing a quantity of fertilizer material having a body portion and a dispensing spout integral with said body portion,
   aperture means in said tubular member between said handle portion and said dispensing portion providing access to the inside of said tubular member, saddle connecting means surrounding said aperture means and providing support for said reservoir means, said dispensing spout being supported in said saddle connecting means and said aperture means by wedge fit, bracket means for supporting the body portion of said reservoir means including an adjustable compression band surrounding said body portion and a support member rigidly secured to said handle portion and connected to said compression band, and control valve means within said dispensing portion adjacent a free end thereof for selectively restricting the hollow interior of said tubular member so as to control the quantity of fertilizer dispensed, said spring means including a coil spring extending substantially parallel to said tubular member with said control rod passing through the center thereof.

3. A portable hand manipulated device for spreading dry fertilizers comprising:

an elongate tubular member having an upper handle portion and a lower dispensing portion, reservoir means capable of storing a quantity of fertilizer material having a body portion and a dispensing spout integral with said body portion, aperture means in said tubular member between said handle portion and said dispensing portion providing access to the inside of said tubular member, saddle connecting means surrounding said aperture means and providing support for said reservoir means, said dispensing spout being supported in said saddle connecting means and said aperture means by wedge fit, bracket means for supporting the body portion of said reservoir means including an adjustable compression band surrounding said body portion and a support member rigidly secured to said handle portion and connected to said compression band, and control valve means within said dispensing portion adjacent a free end thereof for selectively restricting the hollow interior of said tubular member so as to control the quantity of fertilizer dispensed, said spring means including a coil spring extending substantially parallel to said tubular member with said control rod passing through the center thereof, said tubular member being notched in the vicinity of said control valve means so as to permit a wide range of adjustment of said control valve means without interference from said tubular member.

4. A portable device as defined in claim 3 wherein the notched portion of said tubular member includes restricting wall means forming part of said notched portion and extends across a portion of the hollow interior of said tubular member restricting the flow therein ahead of said control valve means in the direction of flow.

5. A portable hand manipulated device for spreading dry fertilizers comprising:

an elongate tubular member having an upper handle portion and a lower dispensing portion, reservoir means capable of storing a quantity of fertilizer material having a body portion and a dispensing spout integral with said body portion, aperture means in said tubular member between said handle portion and said dispensing portion providing access to the inside of said tubular member, saddle connecting means surrounding said aperture means and providing support for said reservoir means, said dispensing spout being supported in said saddle connecting means and said aperture means by wedge fit, bracket means for supporting the body portion of said reservoir means including an adjustable compression band surrounding said body portion and a support member rigidly secured to said handle portion and connected to said compression band, and control valve means within said dispensing portion adjacent a free end thereof for selectively restricting the hollow interior of said tubular member so as to control the quantity of fertilizer dispensed, said spring means including a coil spring extending substantially parallel to said tubular member with said control rod passing through the center thereof, said tubular member being notched in the vicinity of said control valve means so as to permit a wide range of adjustment of said control valve means without interference from said tubular member, said control handle means including lost motion preventive means providing positive actuation of said control rod.

6. A portable hand manipulated device for spreading dry fertilizers comprising:

an elongate tubular member having an upper handle portion and a lower dispensing portion, reservoir means capable of storing a quantity of fertilizer material having a body portion and a dispensing spout integral with said body portion, aperture means in said tubular member between said handle portion and said dispensing portion providing access to the inside of said tubular member, saddle connecting means surrounding said aperture means and providing support for said reservoir means, said dispensing spout being supported in said saddle connecting means and said aperture means by wedge fit, bracket means for supporting the body portion of said reservoir means including an adjustable compression band surrounding said body portion and a support member rigidly secured to said handle portion and connected to said compression band, and control valve means within said dispensing portion adjacent a free end thereof for selectively restricting the hollow interior of said tubular member so as to control the quantity of fertilizer dispensed, scraper plate means integral with the end of said tubular member adjacent said control valve means including a substantially transversely exending hoe-like member having a scoop-shaped upper portion in communication with hollow interior of said tubular member.

7. A portable hand manipulated device for spreading dry fertilizers comprising:

an elongate tubular member having an upper handle portion and a lower dispensing portion, reservoir means capable of storing a quantity of fertilizer material having a body portion and a dispensing spout integral with said body portion, aperture means in said tubular member between said handle portion and said dispensing portion providing access to the inside of said tubular member, saddle connecting means surrounding said aperture means and providing support for said reservoir means, said dispensing spout being supported in said saddle connecting means and said aperture means by wedge fit, bracket means for supporting the body portion of said reservoir means including an adjustable compression band surrounding said body portion and a support member rigidly secured to said handle portion and connected to said compression band, and control valve means within said dispensing portion adjacent a free end thereof for selectively restricting the hollow interior of said tubular member so as to control the quantity of fertilizer dispensed, scraper plate means integral with the end of said tubular member adjacent said control valve means including a substantially transversely extending hoe-like member having a scoop-shaped upper portion in communication with hollow interior of said tubular member, a sod-piercing mechanism secured to the dispensing portion of said tubular member in an easily removable manner including a transversely extending step member, a substantially pointed shaft and frame means for maintaining said shaft rigidly in position with respect to said tubular member.

8. A portable hand manipulated device for spreading dry fertilizers comprising:
   an elongate tubular member having an upper handle portion and a lower dispensing portion,
   reservoir means capable of storing a quantity of fertilizer material having a dispensing spout communicating with the hollow interior of said tubular member substantially adjacent the longitudinal center thereof by wedge fit,
   control valve means within said dispensing portion adjacent a free end thereof including pivotable baffle means for selectively restricting the hollow interior of said tubular member,
   a control rod extending from said control valve means externally along the length of said tubular member to said handle portion,
   tubular housing means clamped to said tubular member for guiding said control rod,
   control handle means connected to said control rod at the end thereof opposite said control valve means and pivotally connected to said handle portion for actuating said control rod to regulate said control valve means, and
   spring means connected between said tubular member and said control handle means for biasing said control handle means to a position wherein said control valve means is closed,
   said reservoir means extending at an angle from the longitudinal axis of said tubular member such that during normal use of said device the reservoir means is disposed essentially vertically in position with the dispensing spout extending in a downward direction.

9. A portable hand manipulated device for spreading dry fertilizers comprising:
   an elongate tubular member having an upper handle portion and a lower dispensing portion,
   reservoir means capable of storing a quantity of fertilizer material having a dispensing spout communicating with the hollow interior of said tubular member substantially adjacent the longitudinal center thereof by wedge fit,
   control valve means within said dispensing portion adjacent a free end thereof including pivotable baffle means for selectively restricting the hollow interior of said tubular member,
   a central rod extending from said control valve means externally along the length of said tubular member to said handle portion,
   tubular housing means clamped to said tubular member for guiding said control rod,
   control handle means connected to said control rod at the end thereof opposite said control valve means and pivotally connected to said handle portion for actuating said control rod to regulate said control valve means, and
   spring means connected between said tubular member and said control handle means for biasing said control handle means to a position wherein said control valve means is closed,
   scraper plate means integral with the end of said tubular member adjacent said control valve means including a substantially transversely extending hoe-like member having a scoop-shaped upper portion in communication with hollow interior of said tubular member.

10. A portable hand manipulated device for spreading dry fertilizers comprising:
    an elongate tubular member having an upper handle portion and a lower dispensing portion,
    reservoir means capable of storing a quantity of fertilizer material having a dispensing spout communicating with the hollow interior of said tubular member substantially adjacent the longitudinal center thereof by wedge fit,
    control valve means within said dispensing portion adjacent a free end thereof including pivotable baffle means for selectively restricting the hollow interior of said tubular member,
    a control rod extending from said control valve means externally along the length of said tubular member to said handle portion,
    tubular housing means clamped to said tubular member for guiding said control rod,
    control handle means connected to said control rod at the end thereof opposite said control valve means and pivotally connected to said handle portion for actuating said control rod to regulate said control valve means, and
    spring means connected between said tubular member and said control handle means for biasing said control handle means to a position wherein said control valve means is closed,
    a sod-piercing mechanism secured to the dispensing portion of said tubular member in an easily removable manner including a transversely extending step member, a substantially pointed shaft, and frame means for maintaining said shaft rigidly in position with respect to said tubular member.

11. A portable device as defined in claim 10 wherein the pivotable baffle means of the control valve means is formed of one-piece folded sheet metal.

12. An elongate tubular member having an upper handle portion and a lower dispensing portion,
    reservoir means capable of storing a quantity of fertilizer material having a body portion and a dispensing spout integral with said body portion,
    aperture means in said tubular member between said handle portion and said dispensing portion providing access to the inside of said tubular member,
    saddle connecting means surrounding said aperture means and providing support for said reservoir means, said dispensing spout being supported in said saddle connecting means and said aperture means by wedge fit,
    bracket means for supporting the body portion of said reservoir means including an adjustable compression band surrounding said body portion and a support member rigidly secured to said handle portion and connected to said compression band, and
    control valve means within said dispensing portion adjacent a free end thereof including pivotable baffle means for selectively restricting the hollow interior of said tubular member,
    a control rod extending from said control valve means externally along the length of said tubular member to said handle portion,
    tubular housing means clamped to said tubular member for guiding said control rod,
    control handle means connected to said control rod at the end thereof opposite said control valve means and pivotally connected to said handle portion for actuating said control rod to regulate said control valve means, and
    spring means connected between said tubular member and said control handle means for biasing said control handle means to a position wherein said control valve means is closed,
    scraper plate means integral with the end of said tubular member adjacent said control valve means including a substantially transversely extending hoe-like member having a scoop-shaped upper portion in communication with hollow interior of said tubular member.

13. An elongate tubular member having an upper handle portion and a lower dispensing portion,
   reservoir means capable of storing a quantity of fertilizer material having a body portion and a dispensing spout integral with said body portion,
   aperture means in said tubular member between said handle portion and said dispensing portion providing access to the inside of said tubular member,
   saddle connecting means surrounding said aperture means and providing support for said reservoir means, said dispensing spout being supported in said saddle connecting means and said aperture means by wedge fit,
   bracket means for supporting the body portion of said reservoir means including an adjustable compression band surrounding said body portion and a support member rigidly secured to said handle portion and connected to said compression band, and
   control valve means within said dispensing portion adjacent a free end thereof including pivotable baffle means for selectively restricting the hollow interior of said tubular member,
   a control rod extending from said control valve means externally along the length of said tubular member to said handle portion,
   tubular housing means clamped to said tubular member for guiding said control rod,
   control handle means connected to said control rod at the end thereof opposite said control valve means and pivotally connected to said handle portion for actuating said control rod to regulate said control valve means, and
   spring means connected between said tubular member and said control handle means for biasing said control handle means to a position wherein said control valve means is closed,
   a sod-piercing mechanism secured to the dispensing portion of said tubular member in an easily removable manner including a transversely extending step member, a substantially pointed shaft, and frame means for maintaining said shaft rigidly in position with respect to said tubular member.

14. An elongate tubular member having an upper handle portion and a lower dispensing portion,
   reservoir means capable of storing a quantity of fertilizer material having a body portion and a dispensing spout integral with said body portion,
   aperture means in said tubular member between said handle portion and said dispensing portion providing access to the inside of said tubular member,
   saddle connecting means surrounding said aperture means and providing support for said reservoir means, said dispensing spout being supported in said saddle connecting means and said aperture means by wedge fit,
   bracket means for supporting the body portion of said reservoir means including an adjustable compression band surrounding said body portion and a support member rigidly secured to said handle portion and connected to said compression band, and
   control valve means within said dispensing portion adjacent a free end thereof including pivotable baffle means for selectively restricting the hollow interior of said tubular member,
   a control rod extending from said control valve means externally along the length of said tubular member to said handle portion,
   tubular housing means clamped to said tubular member for guiding said control rod,
   control handle means connected to said control rod at the end thereof opposite said control valve means and pivotally connected to said handle portion for actuating said control rod to regulate said control valve means, and
   spring means connected between said tubular member and said control handle means for biasing said control handle means to a position wherein said control valve means is closed,
   said spring means including a coil spring extending substantially parallel to said tubular member with said control rod passing through the center thereof.

15. An elongate tubular member having an upper handle portion and a lower dispensing portion,
   reservoir means capable of storing a quantity of fertilizer material having a body portion and a dispensing spout integral with said body portion,
   aperture means in said tubular member between said handle portion and said dispensing portion providing access to the inside of said tubular member,
   saddle connecting means surrounding said aperture means and providing support for said reservoir means, said dispensing spout being supported in said saddle connecting means and said aperture means by wedge fit,
   bracket means for supporting the body portion of said reservoir means including an adjustable compression band surrounding said body portion, and a support member rigidly secured to said handle portion and connected to said compression band and
   control valve means within said dispensing portion adjacent a free end thereof including pivotable baffle means for selectively restricting the hollow interior of said tubular member,
   a control rod extending from said control valve means externally along the length of said tubular member to said handle portion,
   tubular housing means clamped to said tubular member for guiding said control rod,
   control handle means connected to said control rod at the end thereof opposite said control valve means and pivotally connected to said handle portion for actuating said control rod to regulate said control valve means, and
   spring means connected between said tubular member and said control handle means for biasing said control handle means to a position wherein said control valve means is closed,
   said tubular member being notched in the vicinity of said control valve means so as to permit a wide range of adjustment of said control valve means without interference from said tubular member.

16. An elongate tubular member having an upper handle portion and a lower dispensing portion,
   reservoir means capable of storing a quantity of fertilizer material having a body portion and a dispensing spout integral with said body portion,
   aperture means in said tubular member between said handle portion and said dispensing portion providing access to the inside of said tubular member,
   saddle connecting means surrounding said aperture means and providing support for said reservoir means, said dispensing spout being supported in said saddle connecting means and said aperture means by wedge fit,
   bracket means for supporting the body portion of said reservoir means including an adjustable compression band surrounding said body portion and a support member rigidly secured to said handle portion and connected to said compression band, and
   control valve means within said dispensing portion adjacent a free end thereof including pivotable baffle means for selectively restricting the hollow interior of said tubular member,
   a control rod extending from said control valve means externally along the length of said tubular member to said handle portion,
   tubular housing means clamped to said tubular member for guiding said control rod,
   control handle means connected to said control rod at the end thereof opposite said control valve means and pivotally connected to said handle portion for actuating said control rod to regulate said control valve means, and spring means connected between said tubular member and said control handle means for biasing said control handle means to a position wherein said control valve means is closed, said control handle means including lost motion preventive means providing positive actuation of said control rod.

References Cited by the Examiner

UNITED STATES PATENTS

| | | | |
|---|---|---|---|
| 1,833,907 | 12/1931 | Law | 222—470 |
| 1,856,809 | 5/1932 | Gibson et al. | 111—92 |
| 2,222,235 | 11/1940 | Nelson | 111—7.3 |
| 2,860,586 | 11/1958 | Nozell | 11—95 |

ROBERT B. REEVES, *Primary Examiner.*

HADD S. LANE, *Examiner.*